(12) United States Patent
Augusto de Lorenzo

(10) Patent No.: US 6,830,236 B2
(45) Date of Patent: Dec. 14, 2004

(54) LOCKING DEVICE FOR RETRACTABLE STRAP

(76) Inventor: Ricardo Augusto de Lorenzo, Av. Eliseu de Almeida, 1103, Sao Paulo, Sao Paulo (BR)

( * ) Notice: Subject to any disclaimer, the term of this patent is extended or adjusted under 35 U.S.C. 154(b) by 0 days.

(21) Appl. No.: 10/385,403

(22) Filed: Mar. 10, 2003

(65) Prior Publication Data
US 2004/0178400 A1 Sep. 16, 2004

(51) Int. Cl.[7] .................................................. F16B 1/04
(52) U.S. Cl. ........................... 256/1; 256/65.02; 256/47; 403/381; 403/324; 403/325; 403/326
(58) Field of Search ................................ 256/1, 45, 47, 256/65.01–65.02, 65.12, 65.16; 403/381, 315–319, 321, 322.1, 324, 325, 326–328

(56) References Cited

U.S. PATENT DOCUMENTS

| D343,690 S | * | 1/1994 | Carey |
| 5,857,304 A | * | 1/1999 | Karten et al. |
| 6,375,164 B1 | * | 4/2002 | Siegler et al. ................. 256/1 |
| D483,131 S | * | 12/2003 | Tsai |
| 2002/0009329 A1 | * | 1/2002 | Pittman et al. ............. 403/381 |
| 2003/0111657 A1 | * | 6/2003 | Green .......................... 256/45 |

OTHER PUBLICATIONS

Author Unknown, Building Products & Services, Retail Traffic, Mar. 1, 1998.*
http://www.lawrencemetal.com/productlist.html?subcategory=800+Series (Dec. 24, 2001).*

* cited by examiner

Primary Examiner—John R. Cottingham
Assistant Examiner—Ryan M. Flandro
(74) Attorney, Agent, or Firm—McCormick, Paulding & Huber LLP

(57) ABSTRACT

An upright post has a socket for receiving a device at the end of a retractable strap. The device is wedge shaped at the free end of the strap. A releasable locking tab secures the device in the socket. A recess provided in the socket cooperates with the tab to prevent inadvertent release of the fitting from the socket. An actuator button is provided to manually release the locking tab from the recess.

5 Claims, 5 Drawing Sheets

LOCKING DEVICE FOR RETRACTABLE STRAP

The present invention relates to crowd containment devices, and deals more particularly with vertically extending posts of the type housing a retractable strap.

Such posts generally provide for a strap to be withdrawn from one side of the post, and the opposite side of the post is generally provided with a receptacle for receiving a device on the end of the strap of an adjoining post to setup a plurality of such devices in a manner for accommodating people waiting in lines, or for crowd control generally.

SUMMARY OF THE INVENTION

The present invention seeks to solve a problem with respect to inadvertent release of the strap from, one post after it is secured to the top of an adjacent post. Such connections have a tendency to be inadvertently released, and the present inventions seeks to solve this problem by providing a locking device within the device provided at the free end of the strap. In accordance with the present invention the end of the strap is secured inside the device of the present invention, and the device itself is wedge shaped so as to fit within a complementary shaped socket in the post to which it is to be attached.

The present invention relates to an improvement in such a device provided at the free end of such a strap wherein the device is fitted with a manually releasable locking button that is slidably supported in the back side of the device itself. A locking tab 13 is provided in the front surface of the device (which front surface will be of course hidden when the device is placed in a socket of an adjacent post) and the locking tab includes a portion 12 that passes through an opening in a device, and is received in an aligned opening defined in the button. A spring biasing means is provided between the locking tab and the button so that the locking tab 13 is normally biased toward a position for locking the device in the socket of the post. However, the button affords a means for manually disengaging the locking tab 13 from such a socket under the control of one familiar with operation of the device.

As so constructed and arranged inadvertent release of the extended strap, and the associated device provided at the end of the strap from the socket of another post, as for example by the inadvertent raising of the device out of the socket of the adjacent post can be avoided.

DETAILED DESCRIPTION OF THE DRAWINGS

Figure 1:
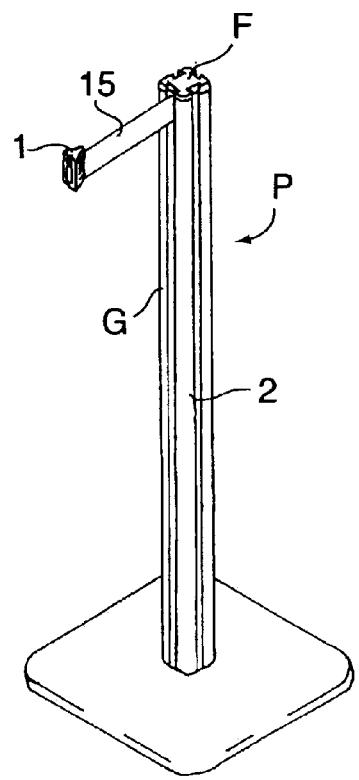
FIG. 1 is a perspective view illustrating a post fitted with a strap that is retractable, and that includes a device of the present invention at the end of that strap.
Figure 6:
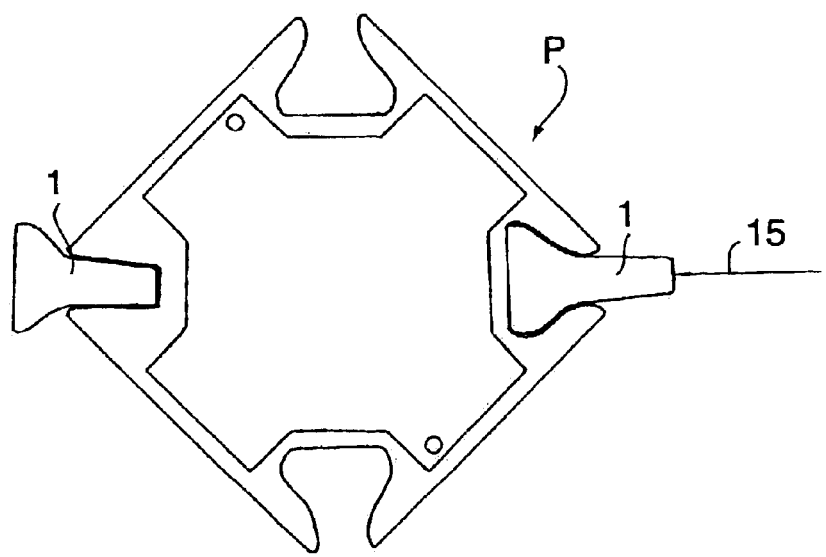
FIG. 6 is a plan view illustrating the manner in which the straps are coupled to an adjacent post. Also shown is a device in opposite position for withdrawing a retractable strap by use of the device.
Figure 7:
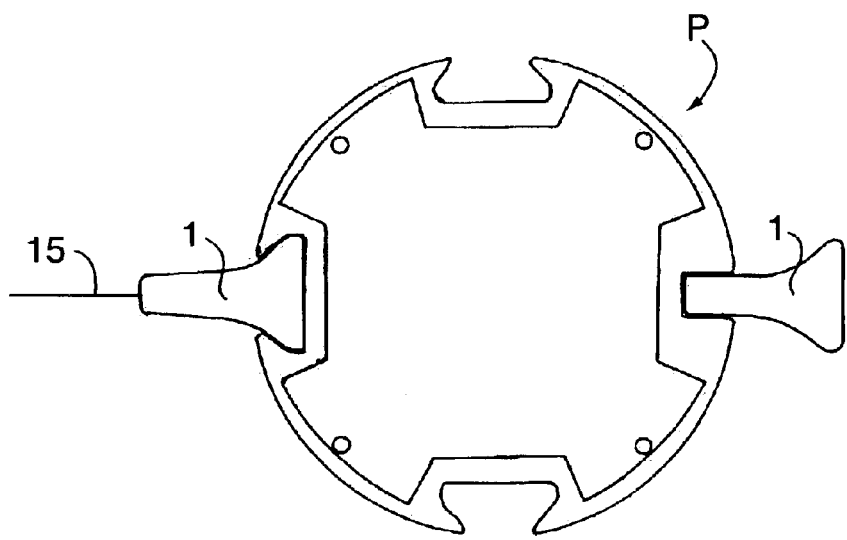
FIG. 7 is a view similar to FIG. 6 but illustrating the respective devices of the present invention arranged in a post of slightly different configuration.

Turning now to the drawings in greater detail, and referring in particular to FIG. 1, a post P is there shown having a plurality of vertically extending grooves G, provided in opposite faces thereof. As shown in FIG. 1 the post is of generally rectangular configuration, whereas FIGS. 6 and 7 show slightly different cross sectional configurations for such a post P. The common denominator of all these various post configurations can be traced to the shape of the groove itself, each groove, except the one associated with the retractable strap 15, having a key shaped configuration such that the device can be placed in the groove for securing this device at the end of the strap to a post.

Conventionally, such posts are provided with retractable straps, and hand held fixtures at the end of the strap for so securing the end of the strap in an adjacent post. However, as mentioned earlier, the tendency for inadvertent release of the holding device from an adjacent post can occur with resultant hazard to those in the proximity of the post to which the retractable strap is attached.

Figure 2:
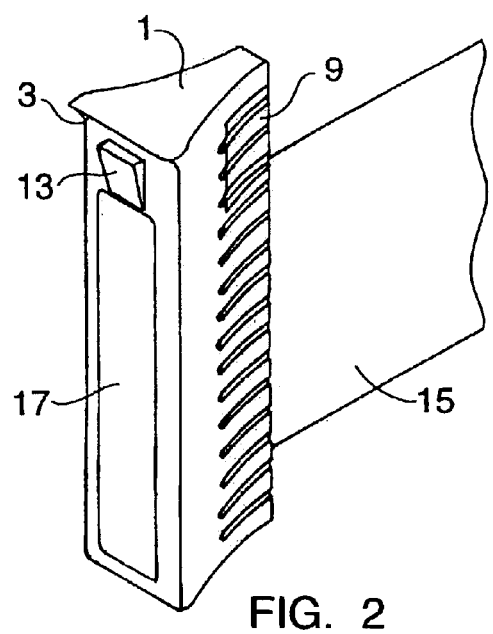
FIG. 2 is a perspective view of the device of the present invention provided at the end of the strap of FIG. 1.

In accordance with the present invention a locking device is provided on the end of the strap 15 as shown in FIG. 2. Thus, the device includes a conventional external configuration, but the device includes a locking tab 13 which is adapted to seat in a corresponding recess such as that shown at R in FIGS. 4 and 5. Such a recess would be provided in each of the three sockets associated with the various post designs of FIGS. 1, 6 and 7. These recesses may be provided in fittings provided for this purpose at the end of each of the posts T so that the post might be of extruded aluminum for example and the end fitting fabricated from injection molded synthetic polymer. Such a configuration is shown in FIG. 1 for example wherein the post P is shown to having a fitting F designed with such a recess R for this purpose.

Figure 4:
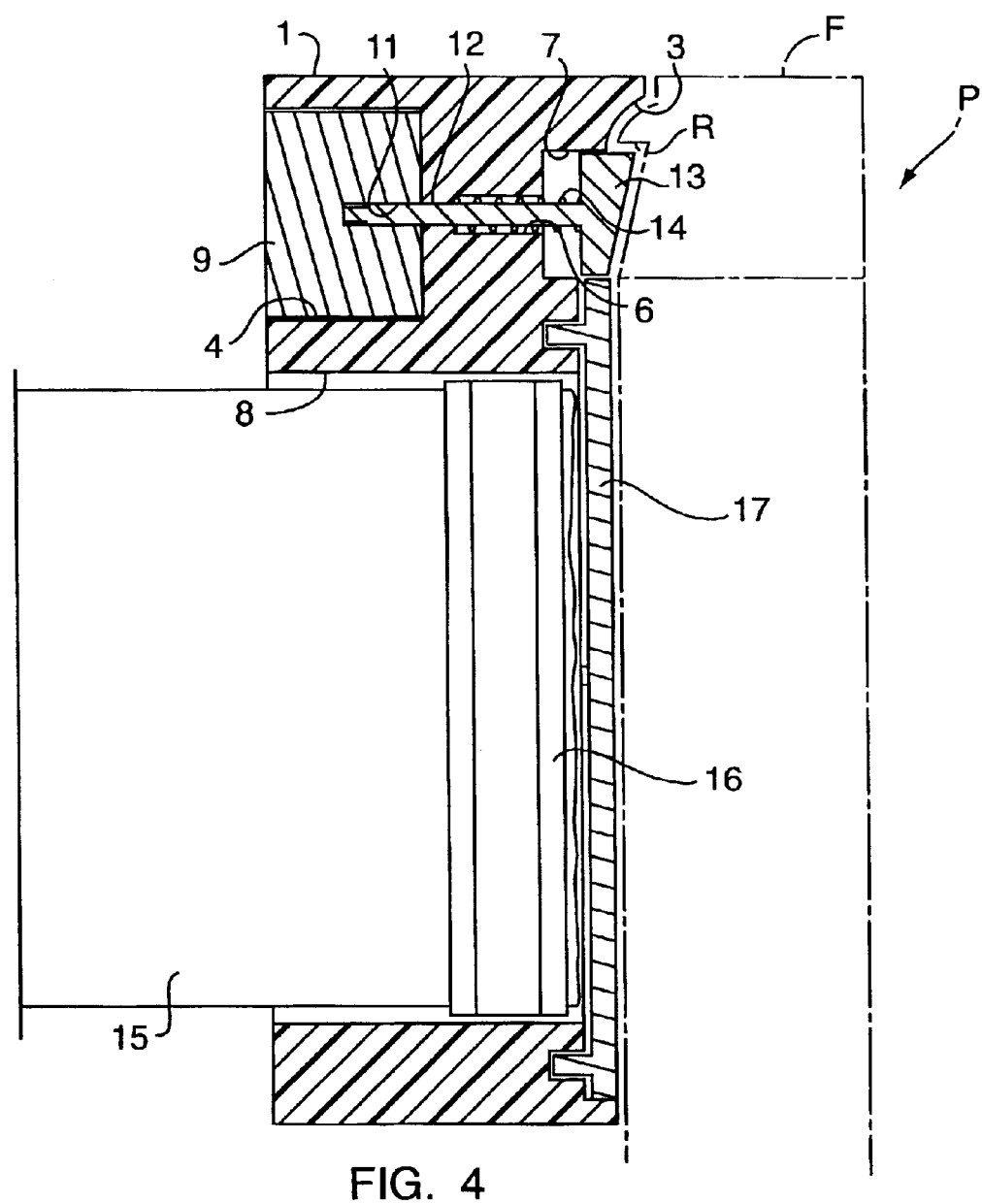
FIG. 4 is a vertical cross section taken through the device and illustrating a post to which the device is attached in broken lines.
Figure 5:
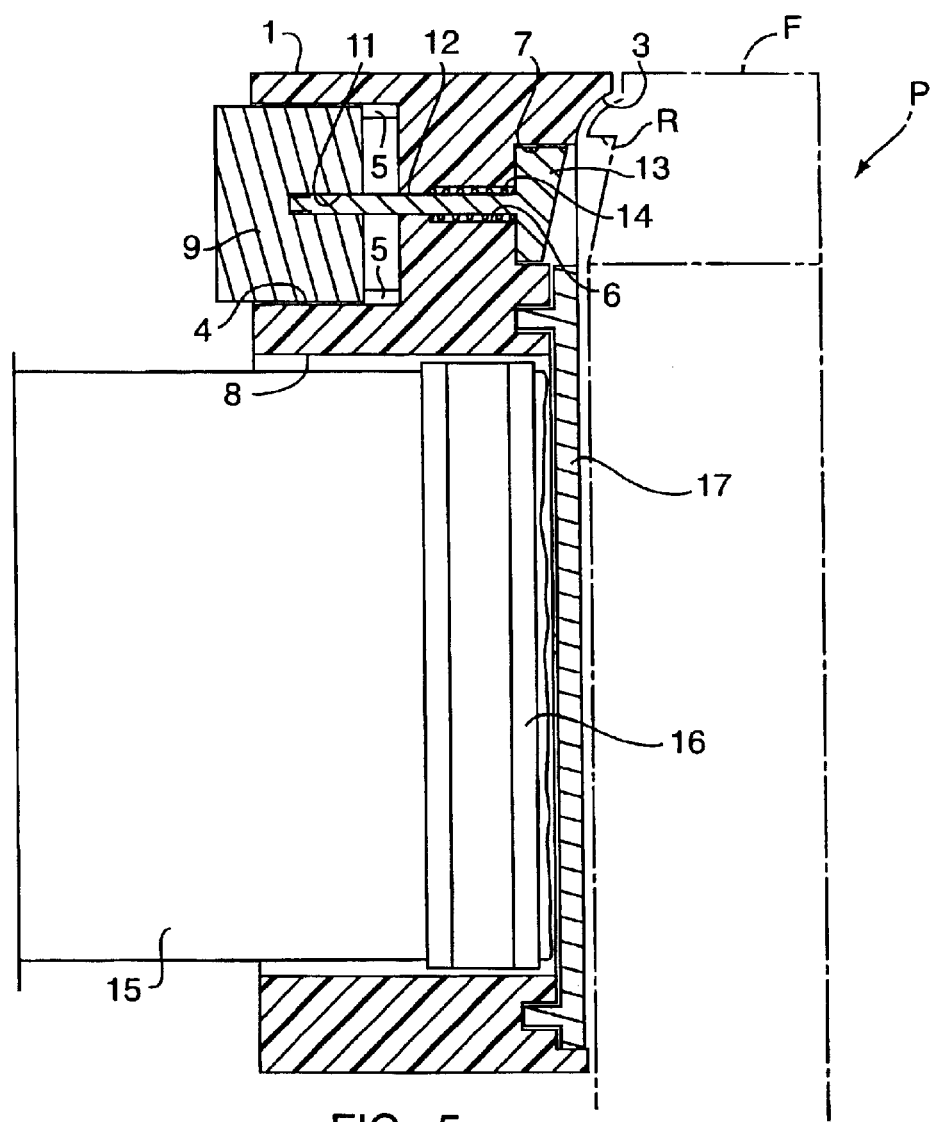
FIG. 5 is a view similar to FIG. 4 but illustrating the device of the present invention in position for release of the device and strap from the post.

Thus, the locking device 1 has an overhanging edge 3 which can be seen to best advantage in FIGS. 4 and 5, and this overhang cooperates with the cross sectional configuration of the fitting F on the top of the post P to prevent downward vertical movement of the locking device 1 relative to the post P. Further, the locking device 1 includes a spring loading locking tab 13 which is coupled to the button 9 by shaft 12. A spring 14 acts between the locking tab 13 and the structure in which the tab 13 and shaft 12 are slidably provided.

The end or shaft 12 is suitably attached to the button 9 so that the button and locking tab move in unison relative to the structure in which they are slidably supported.

As so constructed and arranged, the locking device 1 can be conveniently inserted into one of the grooves provided for this purpose in the post P as suggested in FIG. 4 with the result that the locking tab 13 will engage the recess R provided for this purpose in the upper end fitting F of the post T.

In order to withdraw the device from the post P one need only grasp the tapered sides of the button 9 and pull in the direction shown so as to overcome the biasing force of the spring 14 pulling the locking device 13 out of the recess R so that the device 1 and the associated strap 15 can be released from the post P (see FIG. 5).

Figure 3:
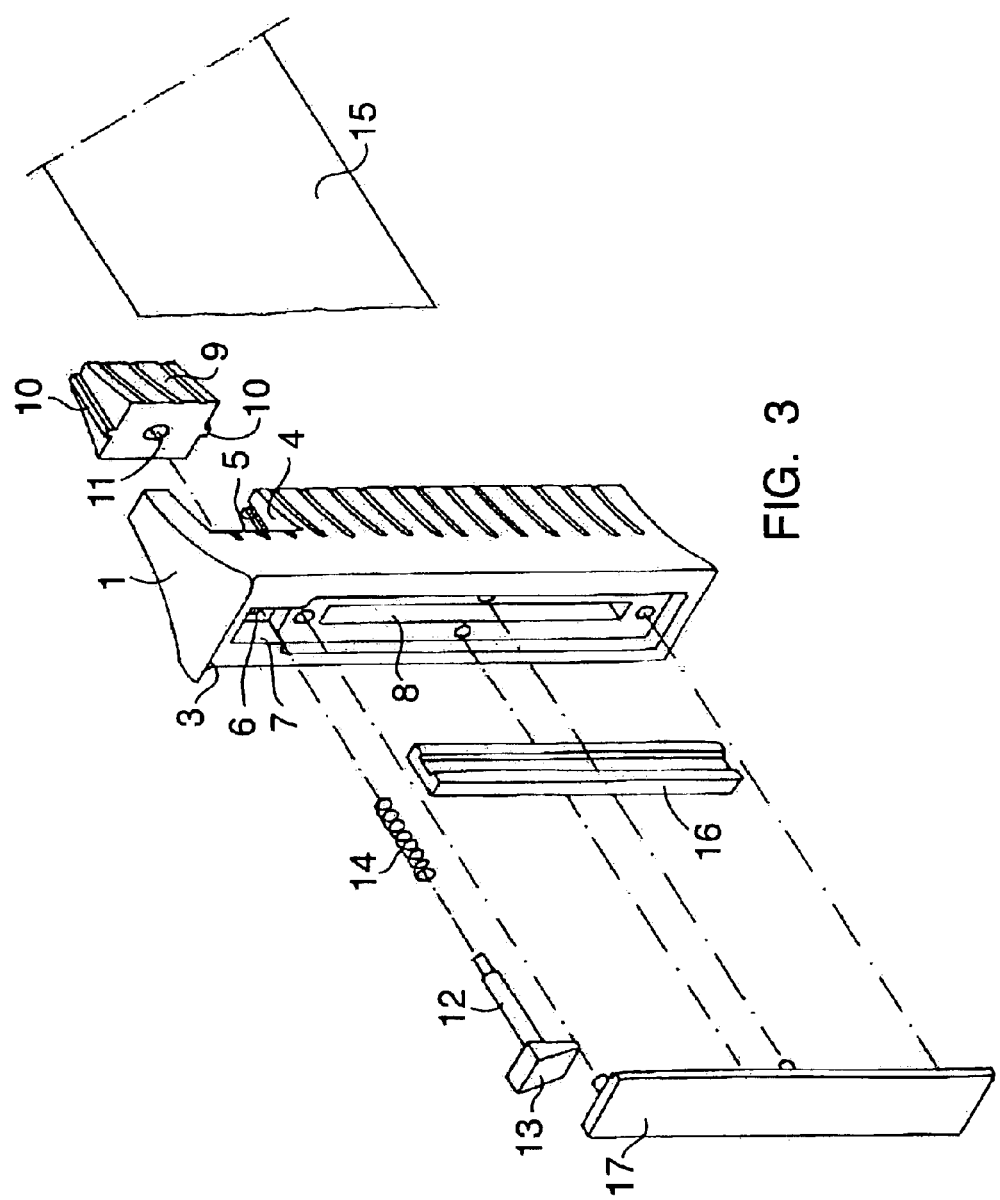
FIG. 3 is a perspective view of the device with the various parts illustrated in exploded relationship.

Turing now to a more detailed description of the device 1, and referring in particular to FIG. 3, the various components are depicted in exploded relationship for better illustrating the shape of each of these components and their assembly to provide the structure of FIGS. 4 and 5. The device 1 as mentions previously comprises a wedge shape so as to fit within the key shaped grooves of the various post configurations of FIGS. 6 and 7. The button 9 is provided with a complementary configuration so as to form a continuous surface with the wedge shaped structure 1 as best shown on FIG. 2. However, the button 9 includes ribs top and bottom which fit within slots 5 of the structure 1 so that the button is slidably received as shown in greater detail in FIGS. 4 and 5.

The strap 15 extends through a rectangular slot (not shown) in the rear face of the structure 1 through the rectangular opening 8 of FIG. 3 where it is locked in place by the rectangular part 16 in a conventional fashion. A cover plate or lid 17 is provided once the strap has been so assembled in the structure 1.

In accordance with the present invention the locking tab 13 and more particularly the shaft portion 12 thereof receives a spring 14 that acts between the locking tab 13 and the structure of the device 1 in which these components are received. The end of shaft 12 is adapted to be received in an opening 11 provided for this purpose in the button 10 and to be secured thereto as mentioned previously.

In light of the above it is to be understood that within the scope of the appended claims, the invention may be practiced otherwise than as specifically described.

I claim:

1. A combination comprising:

an upright post having a socket defined at the upper end thereof, said socket having an upper end defining a recess, a strap having a free end, a device secured to the free end of the strap, said device having a connecting portion extending along the length of said device and adapted to be slid downwardly into the socket from above the post, said device having a locking tab slidably received therein for transverse movement relative to said connecting portion into an engaged position in said recess, an actuator accessible at another portion of said device opposite said connecting portion for manually moving said locking tab out of said engaged position.

2. The combination according to claim 1 further comprising spring biasing means for urging said locking tab toward said engaged position.

3. The combination according to claim 2 wherein said actuator accessible from said another portion of said device comprises a button conforming in shape to that of said device, said button being slidably received in said device and coupled to said locking tab for manual movement thereof.

4. The combination according to claim 3 wherein said upright post socket is defined at least in part by an extruded aluminum shape defining at least three elongated sockets, and wherein said recess is defined by an end fitting provided on the upper end of said post for each said three sockets.

5. The combination according to claim 4 wherein the upper end of said post houses a coiled strap, said coiled strap having said free end to which said device is secured for use with a second post having at least three sockets.

* * * * *